(No Model.) 2 Sheets—Sheet 1.
G. SCHLUDER.
MEANS FOR KEEPING GLASS CLEAR IN REGENERATIVE GLASS FURNACES.
No. 602,111. Patented Apr. 12, 1898.
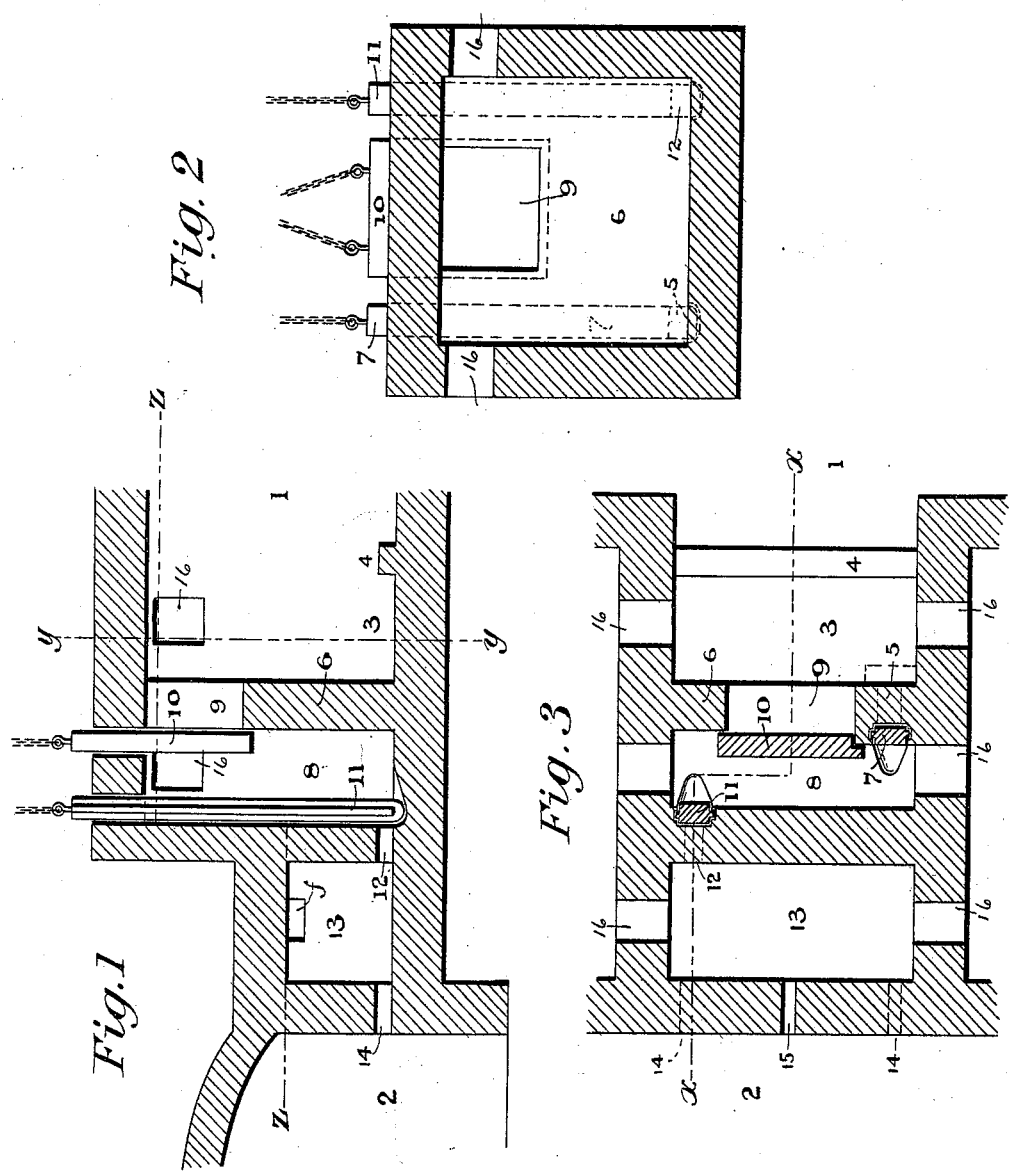
Witnesses:—
Wm H. Rowe
C. H. Schafer
Inventor:
Gustav Schluder,
By his Atty. B. Reichel (No Model.) 2 Sheets—Sheet 2.
G. SCHLUDER.
MEANS FOR KEEPING GLASS CLEAR IN REGENERATIVE GLASS FURNACES.
No. 602,111. Patented Apr. 12, 1898.
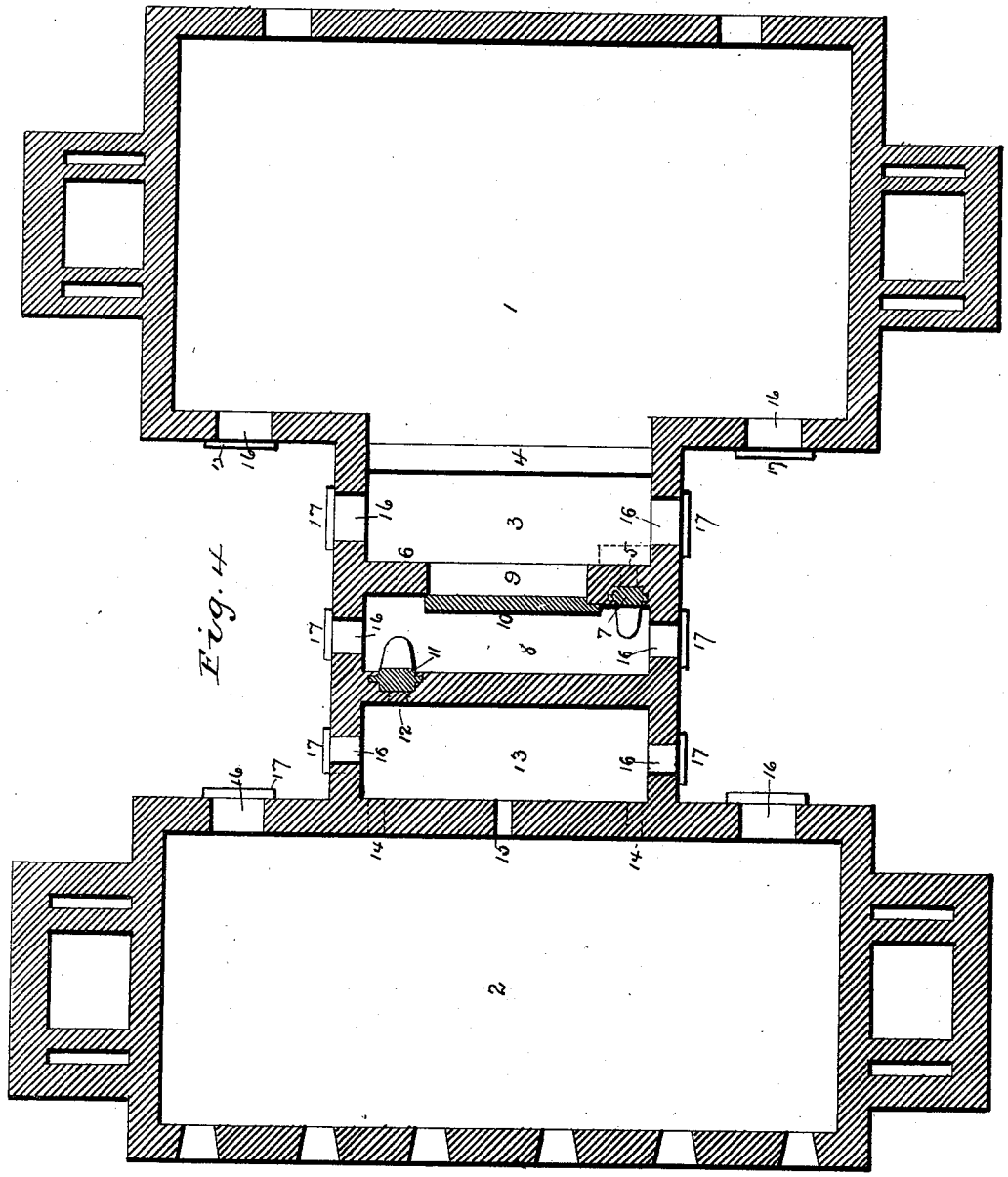
WITNESSES,
Walter Allen
Robt Aiton
INVENTOR,
Gustav Schluder
per
B. Reichell & Co.
attys

UNITED STATES PATENT OFFICE.

GUSTAV SCHLUDER, OF DEUBEN, GERMANY.

MEANS FOR KEEPING GLASS CLEAR IN REGENERATIVE GLASS-FURNACES.

SPECIFICATION forming part of Letters Patent No. 602,111, dated April 12, 1898.

Application filed September 3, 1895. Serial No. 561,346. (No model.) Patented in Germany January 9, 1895, No. 82,304.

*To all whom it may concern:*

Be it known that I, GUSTAV SCHLUDER, a citizen of the Kingdom of Saxony, and a resident of Deuben, near Dresden, in the Kingdom of Saxony, German Empire, have invented certain new and useful Improvements in Means for Keeping Plate-Glass Clear in Regenerative Glass-Furnaces, of which the following is a specification, and for which I have received Letters Patent in Germany, dated January 9, 1895, No. 82,304.

The object of my invention is to provide a plate-glass-melting furnace which will allow the glass to be delivered clear to the working tray or compartment and thus greatly simplify the process of manufacture.

Glass-furnaces which comprise both a melting-compartment and working-compartment usually have a channel which connects both compartments, by which the refined and melted glass mass is conveyed from the former to the latter. As melted glass is as liquid as water, it has been until now impossible to prevent the impure masses from entering the working-compartment, and it followed that the purified glass mass became impure with the rest.

The object of my invention is to provide a suitable arrangement of compartments and a connecting-channel between the melting-compartment and the working-compartment which will control the flow of the melted glass and prevent a premature entrance of the unpurified glass mass into the working-compartment, by which means it is possible to manufacture an extraordinarily clear and superior glass. In accomplishing this object I use the well-known methods of stopping up the partially cooled or hardened glass, as will readily appear.

In the accompanying drawings, Figure 1 is a longitudinal vertical section in line *x x* of Fig. 3; Fig. 2, a transverse vertical section in line *y y* of Fig. 1, and Fig. 3 a horizontal section in line *z z* of Fig. 1. Fig. 4 is a horizontal section taken through the furnace.

The melting-tray 1 and working-compartment 2 are built up of masonry in a suitable manner, the floor of the melting-compartment being arranged a short distance from above and at one side of the working-compartment. The side walls of the melting-compartment are perforated, and the connecting-channel is divided into different compartments, hereinafter described.

The compartment 3 is separated from the melting-compartment 1 by a curb or threshold 4, which is raised above the bottom of the compartment and extends entirely across the same. From the compartment 3 a channel 5 in the division-wall 6 is controlled by a slide-valve 7, the said valve being tightly closed over the channel 5, which latter is located in the corner and at one end of the compartment 3 and connects the same with one end of a narrow compartment 8 at the end of and parallel with the melting-compartment 1, which latter also communicates by the opening 9, having a slide-door 10, located at the top and middle part of the division-wall 6 between the compartment 3 and the compartment 8, so that the hot penetrating gases may enter the compartment 8 from the melting-compartment 1. From the compartment 8 a valve 11 controls a channel 12 at the bottom of the compartment 8 and upon the side opposite that of the channel 5, leading from the compartment 3 and melting-compartment. The said channel 12 leads to the compartment 13, from whence two channels 14 of small area communicate with the working-compartment 2, as will hereinafter appear. The compartment 13 is also connected by a gas-channel 15 with the working-compartment 2, and the same temperature is thus maintained between the said compartment and the working-compartment.

In the compartments 3 8 13 air-holes 16 are located in the side walls, which may be covered by plates 17 to open or close them.

The operation of this glass-melting furnace is as follows: First the melting-compartment is charged with so much material that the melted mass will flow over the curb 4 and can fill up the compartment 3 to the height of the curb, and hereupon takes place the purifying of the glass mass, which is quickly carried on, as it is of no great size. During this purifying process the channels 5 and 12 remain closed, and it is also advantageous that the channel 5 at this time be kept closed up against the compartment 3 by means of a stone or other obstruction 18, as shown by dotted lines in Fig. 3. The opening 5 also remains closed, and the air-holes 16 of the compartment 8 are opened, and this compartment is so cooled that the glass mass passing into the intermediate or settling compartment 8 through the channel 5 becomes sufficiently chilled and hardened to flow freely without entering and sticking in the interstices or corners of said passages, but the mass is not hardened through and through and can therefore be moved and handled for further treatment. The air-holes 16 of the compartments 3, 8, and 13 are used not only to look through, but are also used for working the metal or for skimming off the glass-gall. When the glass mass in the compartment 3 has become clear, the valve 7 will be raised; but it is first necessary to close up the air-holes 16. This may be done by opening the gas-window 9 by lifting the slide-door 10. The compartment 8 is then heated sufficiently to allow the slide-valve 7 to be raised, and the melting glass mass can then flow over the curb 4, which latter is a little higher than the channel 5, so that the glass mass after having been distributed in both compartments at last reaches to the top of the said channel 5. After the molten glass has passed into the compartment 8 the valve 7 is again closed and the glass mass is partly cooled by opening the air-holes 16, and it remains in this condition. The entire mass passes through the compartment 8, and the melting and purifying of the glass is conducted in the compartment 2 with the greatest ease. After the mass in the compartment 1 is done entirely, the contents of the compartment 8 is again placed in a liquid condition by opening the aperture 9, the heated gases passing from the melting-compartment into the compartment 8, and when in proper condition the molten glass mass is allowed to flow from the compartment 8 through the discharge-compartment 13 into the working-compartment. The molten mass is cooled off sufficiently while in the compartment 8 to reach a suitable temperature for working. Before the entire glass mass is drawn off—that is, as soon as the curb 4 is again visible through the glass mass—the valves 7 and 11 are closed, by which means so much glass is caught and retained in the compartment 8 as will be necessary to close the channel 5. The compartment 8 is again cooled off and the process hereinbefore described is again carried on.

It is obvious that by the process and with the apparatus herein described a clear and perfectly pure glass mass may be run into the working-compartment, and, furthermore, a revivification and repurification of the mass may be effected by means of the compartments 1 and 8, the valve-controlled channels 5 and 12, and the covered openings 16, through which latter the various processes may be closely watched.

I claim as my invention and desire to secure by Letters Patent—

1. In a glass-furnace, the melting and working compartments placed at opposite ends of the furnace, combined with the compartments 3 extending from the melting-compartment, the compartment 8 connected with the compartment 3 by the passage 5, and the opening 9 through the dividing-wall, the compartment 13 connected by suitable passages with the working-compartment, the compartment 13 being connected to the compartment 8 by means of the passage 12, and with the working-compartment by the passages 14 and 15, the valve 10 for controlling the passage or opening 9, and the valves 7 and 11 for controlling the passages 5 and 12, the parts being arranged to operate substantially as shown.

2. A glass-furnace comprising a glass-melting compartment for melting the batch, having a curb extending across the floor of the same, dividing the melting-compartment into two parts, an outlet-channel a little lower than the said curb, a working-compartment and an intermediate compartment between said outlet-channels and working-compartment and suitable connecting-channels extending from one compartment to the other, substantially as described.

3. A plate-glass-melting furnace comprising a melting-compartment and working-compartment, an intermediate compartment, and a discharge-compartment between the said intermediate and working compartments, and valves controlling respectively an adit-channel at one end of the intermediate compartment and a discharge-channel at the other end thereof, substantially as described.

4. A plate-glass-melting furnace comprising a melting-compartment and working-compartment, an intermediate settling-compartment, valve-controlled channels at the bottom and at opposite ends thereof, and a gas or head window having a door or damper to cover the same at the upper part of the dividing-wall between said compartments, substantially as described.

5. A plate-glass-melting furnace comprising a melting-compartment, a working-compartment, an intermediate compartment, valve-controlled channels at opposite ends thereof, a discharge-compartment between the intermediate and working compartments, and plate closed and controlled windows for observation and for working the glass in the said melting intermediate and discharge chambers, substantially as described.

In testimony that I claim the foregoing as my invention I have signed my name in presence of two subscribing witnesses.

GUSTAV SCHLÜDER.

Witnesses:
EMIL REICHELT,
REINHOLD SORGE.